United States Patent
Parker

(10) Patent No.: US 9,438,821 B1
(45) Date of Patent: Sep. 6, 2016

(54) METHOD FOR APPLYING MULTI-LAYERED FILM GRAIN AND TEXTURE MAPPING TO A DIGITAL VIDEO IMAGE

(71) Applicant: Suny Behar Parker, Los Angeles, CA (US)

(72) Inventor: Suny Behar Parker, Los Angeles, CA (US)

(*) Notice: Subject to any disclaimer, the term of this patent is extended or adjusted under 35 U.S.C. 154(b) by 0 days.

(21) Appl. No.: 14/683,611

(22) Filed: Apr. 10, 2015

Related U.S. Application Data

(60) Provisional application No. 61/978,777, filed on Apr. 11, 2014.

(51) Int. Cl.
| | | |
|---|---|---|
| G06K 9/40 | (2006.01) |
| H04N 5/265 | (2006.01) |
| G06T 7/40 | (2006.01) |
| G06K 9/46 | (2006.01) |

(52) U.S. Cl.
CPC .......... H04N 5/265 (2013.01); G06K 9/4661 (2013.01); G06T 7/40 (2013.01)

(58) Field of Classification Search
CPC .......... G06T 5/001; G06T 5/20; G06T 5/40; G06T 5/50; H04N 5/265
See application file for complete search history.

(56) References Cited

U.S. PATENT DOCUMENTS

| | | | | |
|---|---|---|---|---|
| 4,009,334 A | * | 2/1977 | Sypula | H04N 5/21 348/623 |
| 4,107,736 A | * | 8/1978 | Lowry | H04N 9/646 348/620 |
| 7,432,986 B2 | * | 10/2008 | Winger | H04N 19/61 348/625 |
| 7,664,337 B2 | * | 2/2010 | Balram | G06T 5/002 348/241 |
| 7,719,618 B2 | * | 5/2010 | Winger | H04N 19/61 348/625 |
| 7,889,940 B2 | * | 2/2011 | Balram | G06T 5/002 348/622 |
| 7,899,113 B2 | | 3/2011 | Gomila et al. | |
| 8,139,648 B2 | * | 3/2012 | Murayama | H04N 19/46 375/240.27 |
| 8,681,878 B2 | * | 3/2014 | Murayama | H04N 19/46 375/240.27 |
| 9,100,647 B1 | * | 8/2015 | Balram | H04N 19/117 |
| 2007/0036452 A1 | | 2/2007 | Llach et al. | |

* cited by examiner

*Primary Examiner* — Amir Alavi
(74) *Attorney, Agent, or Firm* — Karish & Bjorgum, PC

(57) ABSTRACT

A method for processing digital video to have grain corresponding to a motion picture film, the method having the steps of: receiving a plurality of different grain assets corresponding to different film exposure levels; receiving a digital video image; separating the digital video image into a plurality of luminance delineated matte images; adding a different grain asset to each of the plurality of luminance delineated matte images to create a plurality of asset plates; and combining the plurality of asset plates to form a final digital video image.

20 Claims, 5 Drawing Sheets

METHOD FOR APPLYING MULTI-LAYERED FILM GRAIN AND TEXTURE MAPPING TO A DIGITAL VIDEO IMAGE

CROSS REFERENCE TO RELATED APPLICATION

This application claims priority of U.S. Provisional Patent Application No. 61/978,777, filed on Apr. 11, 2014, entitled METHOD FOR APPLYING MULTI-LAYERED FILM GRAIN TEXTURE MAPPING TO A DIGITAL VIDEO IMAGE IN REAL TIME, the entire contents of which are hereby incorporated herein by reference.

BACKGROUND

The present invention relates to digital video processing and more particularly to a method for applying film grain and texture mapping to a digital video image.

The photographic film used to make motion pictures comprises silver-halide crystals dispersed in an emulsion that is deposited in thin layers on a film base. The exposure and development of these crystals form the photographic image, which is made at the largest scale of discrete particles of silver. With color negatives, tiny blobs of dye exist on the sites where the silver crystals form after chemical removal of the silver following development. These small specs of dye form the 'grain' in color film. Grain occurs randomly in the resulting image because of the random formation of silver crystals on the original emulsion. Within a uniformly exposed area, some crystals develop by exposure, others not. Grain varies in size and shape. The faster the film (i.e., the greater the sensitivity to light), the larger the clumps of silver formed and blobs of dye generated, and the more they tend to group together in random patterns. The grain pattern is typically known as 'granularity'.

The naked eye cannot distinguish individual grains, which vary from about 0.0002 mm to 0.002 mm. Instead, the eye resolves groups of grains, which the viewer identifies as film grain. The larger the image resolution, the more likely the viewer will perceive the film grain. In some sense, film grain constitutes the correlated noise inherent in the physical process of developing of photographic film. The presence of film grain denotes 'real-world' images in contrast to 'computer-generated' material with no film grain. Images without film grain look like hyper-reality, simply too flat and too sharp to be real. Film grain adds a layer of dithering which replicates the human perceptual system. For this reason, film grain remains a desired 'artifact' in most images and video material.

However, it is becoming increasingly difficult to acquire motion picture film raw stock and to get the film stock processed in a timely manner at a laboratory. Accordingly, digital video is being used for more television shows and movies. Because digital video does not have film grain, methods have been developed to try and impart a film grain look to digital video Currently, the methods for making digital video look like film generally fall into two categories: applying digital film grain or applying analog film grain. The first method (digital grain) consists of computer generated video noise designed to replicate the random particles of film grain and create the effect of "film grain". This method is only moderately successful in that it is able to create a seemingly random pattern of noise, but that pattern of noise looks "digital" rather than analog. The grain is mostly of the same size, texture and color. When film is developed, it goes through several chemical baths that create patterns, geometries, waves and colors in the film emulsion itself. These are very subtle but noticeable effects that fail to be rendered by digital grain. While in some instances digital grain might look somewhat "film like" on a small screen, the digital artifacts created by digital grain and the lack of true movement, geometry and patterns do not survive scrutiny on a large theatrical motion picture screen.

The second method (analog film grain) usually involves simply scanning a piece of motion picture film and overlaying the grain of the film over the video image. While better than digital grain, this process produces only mediocre results and has at least two major inherent flaws. First, scanning a single piece of film does not accurately represent the full tonal value and granularity of a particular motion picture film stock. One singular area of the original film stock is used to grossly represent the entire stock. This over-simplification results in a flat, two-dimensional representation of the original film stock that makes it appear more like digital grain than analog grain due to the repetitiveness of the shapes and geometry over the entire image area. Second, the application of film grain onto digital video is presently mostly a post production rendered process. This means that the digital video project is first completed, including full color correction, and then a layer of film grain is applied and rendered to your footage for later review and approval. This method does not allow for creativity and input from filmmakers at the color correction stage. It is simply an "apply and bake" process with very little control and finesse.

Accordingly, there is a need for an improved system and method for imparting film like grain to a digital video image that remedies the shortcomings of the prior art.

SUMMARY

The present invention, according to an embodiment, provides for film grain and texture mapping that is a creative tool available to filmmakers during the color correction phase of a project. Selectively adding more grain in certain areas of the image, and removing grain in other areas helps filmmakers achieve results that are closer to their narrative intent. This invention, according to an embodiment, allows for the full multi-dimensional and multi-layered textural tonality of a motion picture film stock to be represented on a final video image. This invention, according to an embodiment, also allows for this film grain and texture layering to proceed during the color correction process with the full input and collaboration of the filmmaker. In an embodiment, the invention allows for the film grain and texture layering to proceed in real-time during the color correction process.

The present invention, according to an embodiment, is directed to a method for processing digital video to have grain corresponding to a motion picture film, the method comprising: receiving a plurality of different grain assets corresponding to different film exposure levels; receiving a digital video image; separating the digital video image into a plurality of luminance delineated matte images; adding a different grain asset to each of the plurality of luminance delineated matte images to create a plurality of asset plates; and combining the plurality of asset plates to form a final digital video image.

Optionally, according to an embodiment, there are three different grain assets corresponding to different film exposure levels and the digital video image is divided into three luminance delineated matte images. A first grain asset corresponds to a toe of a DLogE curve for the motion picture film. A second grain asset corresponds to a straight line of the DLogE curve for the motion picture film. A third grain asset may correspond to a shoulder of the DLogE curve for the motion picture film. A first luminance delineated matte image has luminance values corresponding to the toe of the DLogE curve for the motion picture film. A second luminance delineated matte image has luminance values corresponding to the straight line of the DLogE curve for the motion picture film. A third luminance delineated matte image has luminance values corresponding to the shoulder of the DLogE curve for the motion picture film.

Optionally, according to an embodiment, there are five different grain assets corresponding to different film exposure levels and the digital video image is divided into five luminance delineated matte images. A first grain asset corresponds to a shadow portion of a DLogE curve for the motion picture film. A second grain asset corresponds to a low mid portion of the DLogE curve for the motion picture film. A third grain asset corresponds to a midtones portion of the DLogE curve for the motion picture film. A fourth grain asset corresponds to a high mid portion of the DLogE curve for the motion picture film. A fifth grain asset corresponds to a highlights portion of the DLogE curve for the motion picture film.

A first luminance delineated matte image has luminance values corresponding to the shadow portion of the DLogE curve for the motion picture film. A second luminance delineated matte image has luminance values corresponding to the low mid portion of the DLogE curve for the motion picture film. A third luminance delineated matte image has luminance values corresponding to the midtones portion of the DLogE curve for the motion picture film. A fourth luminance delineated matte image has luminance values corresponding to the high mids portion of the DLogE curve for the motion picture film. A fifth luminance delineated matte image has luminance values corresponding to the highlights portion of the DLogE curve for the motion picture film.

The method may further comprise: receiving a film type. Optionally, the method further comprises: receiving at least one threshold modification for separating the digital video image into a plurality of luminance delineated matte images. Additionally, the method may further comprise receiving at least one grain application modification for changing the opacity, gain, sizing, or softness of grain asset application to at least one of the plurality of luminance delineated matte images.

In an embodiment, the method further comprises displaying an augmented digital video image wherein each of the plurality of luminance delineated matte images are displayed in a different color. Optionally, the method further comprises redisplaying the augmented digital video image to reflect the received at least one threshold modification for separating the digital video image into a plurality of luminance delineated matte images. Optionally, the method further comprises redisplaying the augmented digital video image to reflect the received at least one grain application modification.

The present invention, according to an additional embodiment, is directed to a computer readable medium containing program instructions for causing a computer to perform a method for processing digital video to have grain corresponding to a motion picture film comprising the steps of: receiving a plurality of different grain assets corresponding to different film exposure levels; receiving a digital video image; separating the digital video image into a plurality of luminance delineated matte images; adding a different grain asset to each of the plurality of luminance delineated matte images to create a plurality of asset plates; and combining the plurality of asset plates to form a final digital video image.

Optionally, according to an embodiment, there are three different grain assets corresponding to different film exposure levels and the digital video image is divided into three luminance delineated matte images. Optionally, there are five different grain assets corresponding to different film exposure levels and the digital video image is divided into five luminance delineated matte images.

The computer readable medium may further comprise program instructions for causing a computer to receive a film type. The computer readable medium may further comprise program instructions for causing a computer to receive at least one threshold modification for separating the digital video image into a plurality of luminance delineated matte images. The computer readable medium may further comprise program instructions for causing a computer to receive at least one grain application modification for changing the opacity, gain, sizing or softness of grain asset application to at least one of the plurality of luminance delineated matte images.

In an embodiment, the computer readable medium further comprises program instructions for causing a computer to display an augmented digital video image wherein each of the plurality of luminance delineated matte images are displayed in a different color. Optionally, the computer readable medium further comprises program instructions for causing a computer to redisplay the augmented digital video image to reflect the received at least one threshold modification for separating the digital video image into a plurality of luminance delineated matte images.

The present invention, according to an additional embodiment, is directed to a system for processing digital video to have grain corresponding to a motion picture film, the method comprising: a means for receiving a plurality of different grain assets corresponding to different film exposure levels; a means for receiving a digital video image; a means for separating the digital video image into a plurality of luminance delineated matte images; a means for adding a different grain asset to each of the plurality of luminance delineated matte images to create a plurality of asset plates; and a means for combining the plurality of asset plates to form a final digital video image.

BRIEF DESCRIPTION OF THE DRAWINGS

The features, aspects and advantages of the present invention will become better understood with regard to the following description, appended claims and accompanying figures wherein:

DETAILED DESCRIPTION

Figure 1:
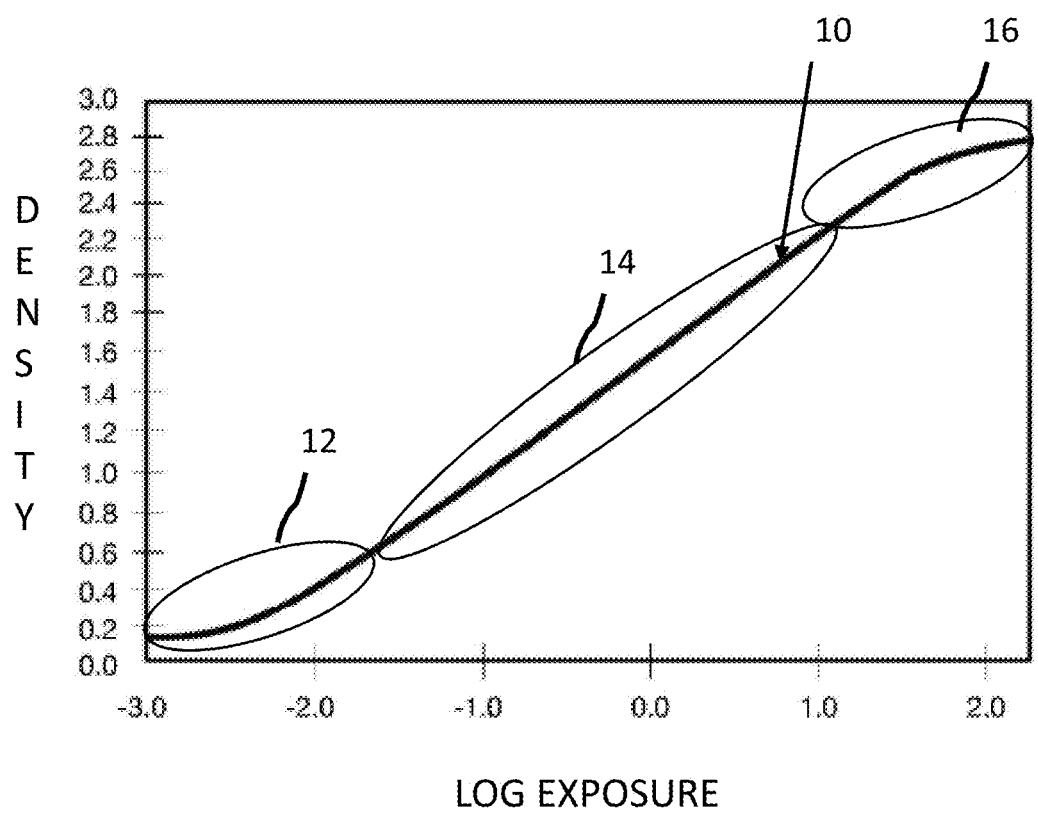
FIG. 1 is a graph indicating three different regions of a density versus exposure curve of motion picture film.

This invention, according to an embodiment, is directed to a new method for making digital video content look like it was acquired on motion picture film stock. Additionally, a method according to an embodiment of the present invention may be performed in a real-time color grading environment rather than as a post production rendered process.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage may represent one or more devices for storing data, including read-only memory (ROM), random access memory (RAM), magnetic disk storage mediums, optical storage mediums, flash memory devices and/or other non-transitory computer readable mediums for storing information. The term "computer readable medium" includes, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a computer-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

The software identified above can also be constructed in a module. A module is a logically self-contained and discrete part of a larger computer program, for example, a subroutine or a co-routine. Modules are typically incorporated into the program through interfaces. A module interface expresses the elements that are provided and required by the module. The elements defined in the interface are detectable by other modules. The implementation contains the executable code that corresponds to the elements declared in the interface. Modules perform logically discrete functions. A module can interact with other modules of the system to achieve its purpose.

A film characteristic curve (DLogE) plots the amount of exposure against the density achieved by that exposure. As shown in FIG. 1, a characteristic curve of motion picture film is not a linear straight line, but rather an S shaped curve 10. The fact that a characteristic curve is not purely linear shows that a motion picture films' response to light is not evenly distributed from shadows all the way to highlights. The silver halide particles in the films' gelatin base react differently to different light sources and cause a grain pattern that is not even across the entire frame. Yet, most processes for adding simulated film grain to digital images simply lay one layer of evenly exposed film over a digital image. This invention more accurately represents the full tonal range of motion picture film by considering the film grain described in all regions of the characteristic curve, including for example: a shoulder region 12, a straight line region 14, and a toe region 16 of the curve.

Figure 2:
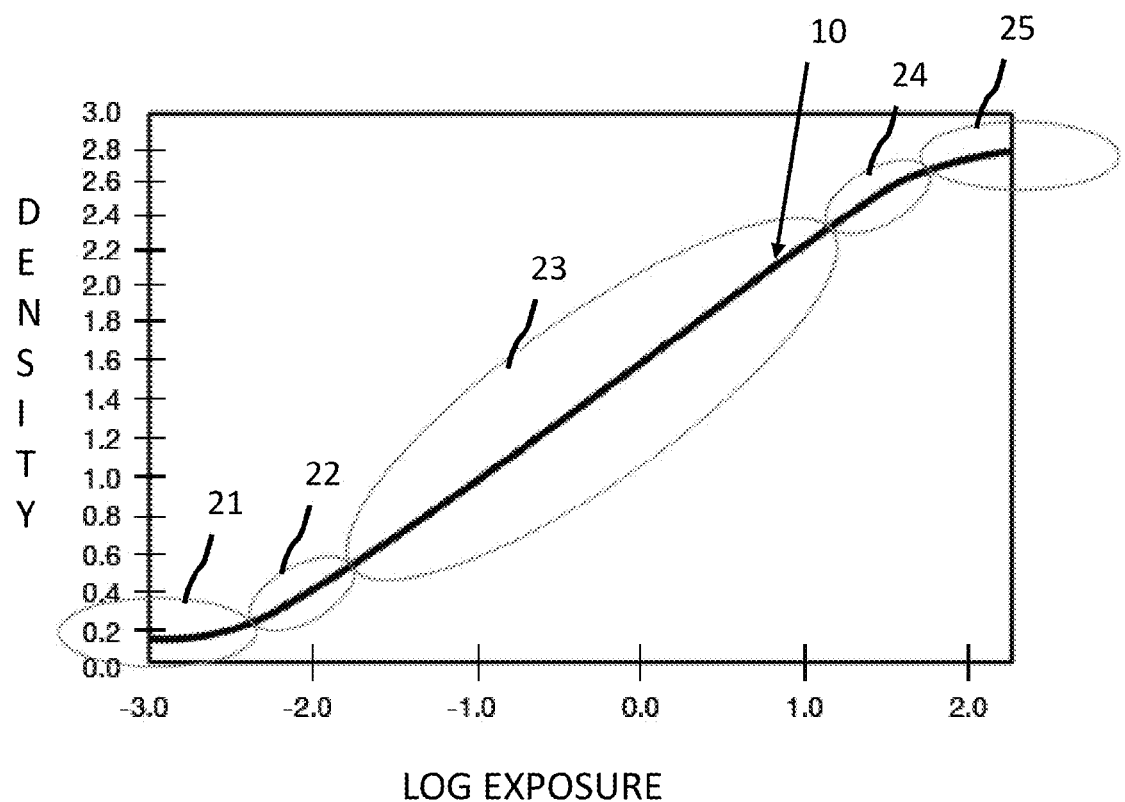
FIG. 2 is a graph indicating five different regions of a density versus exposure curve of motion picture film.

In an embodiment, three regions of the film's characteristic curve, the shoulder region 12, the straight line region 14, and the toe region 16, are sampled. In an additional embodiment, as shown in FIG. 2, five separate regions of the film's characteristic curve, a shadows region 21, a low mids region 22, a midtones region 23, a high mids region 24 and a highlights region 25 are sampled. As will be understood by one of skill in the art, the non-linear portions of a film's characteristic curve may be divided into additional regions, such as 4, 6, 7, 8, 9, 10, 11 or 12 regions, that may be separately sampled and utilized in digital imaging processing. For example, in an additional embodiment of the present invention, 12 separate regions of a film's characteristic curve, such as for example four shadow regions, four mid regions and four highlight regions, are sampled.

When trying to model motion picture film that has gone through traditional laboratory development processes, sampling and dividing the DLogE curve according to luminance values is often sufficient. However, in instances where film is "cross-processed", "bleach bypassed" or otherwise altered in the development process, it may be preferable to add further divisions to account for color shifts in the toe 12, straight line 14 and shoulder 16 regions of the DLogE curve.

Figure 3:
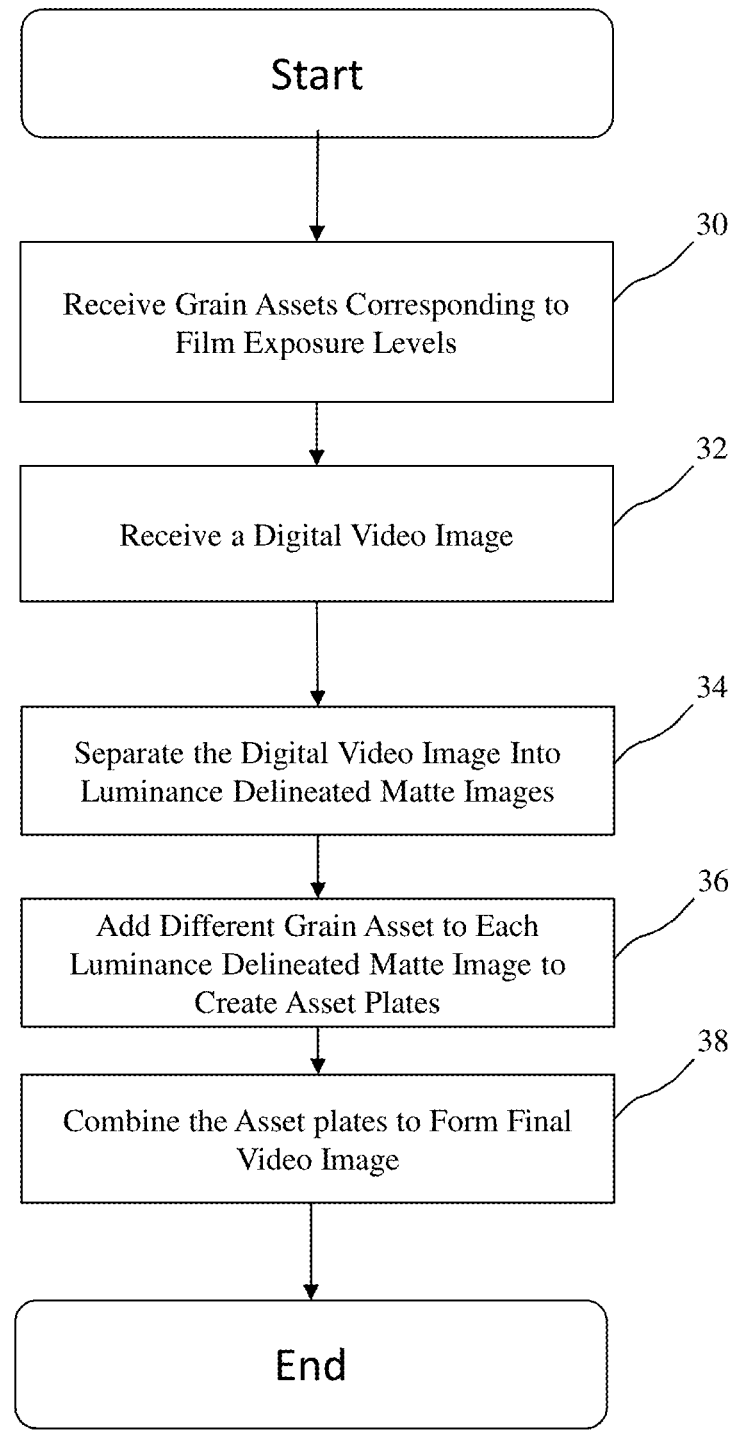
FIG. 3 is a flowchart showing a method for applying multi-layered film grain according to an embodiment of the present invention.

As shown in FIG. 3, a method for processing digital video to have grain corresponding to a motion picture film according to an embodiment of the preset comprises the following steps: receiving a plurality of different grain assets corresponding to different film exposure levels 30; receiving a digital video image 32; separating the digital video image into a plurality of luminance delineated matte images 34; adding a different grain asset to each of the plurality of luminance delineated matte images to create a plurality of asset plates 36; and combining the plurality of asset plates to form a final digital video image 38. The steps in the above method are described in more detail below.

In order to obtain grain assets, a given film type is analyzed and sampled to obtain grain density at various exposure levels. A camera is loaded with a particular film for which grain is ultimately to be simulated, such as for example Kodak® Vision3 500T 5219, Kodak® Vision3 250D 5207, Eastman® Double-X 5222, Fuji® Eterna 500, Fuji® Eterna Vivid 500, and Fuji® Eterna 250D. The camera is pointed at a gray surface and masked with an opaque, neutral color disc. This process ensures that there are no shadows or uneven portions of the frame. A spot meter is set for the rated ISO of the film. The film is then exposed in one stop increments of over and under exposure from minus 6 stops all the way to 6 stops of over exposure. The film is then developed "normal" with no compensation for over or under exposure. As will be understood by those of skill in the art, other color surfaces, color disks, increments and levels of exposure, and other development processes may be used depending on the film type and grain effects desired to be utilized.

After being developed, the film is scanned using a film scanner (such as an Imagica® or Arri® film scanner). Each frame of the film is scanned in its entirety. In an embodiment, once a film frame is acquired, the frame is subjected to a digital process called "dustbusting". In this process, a computer scans the entire film frame looking for anomalies and inconsistencies inside the frame. Those anomalies are usually dust, hair or minor scratches. The computer then digitally removes those elements before rendering out a completed scanned frame such as in a digital DPX, OpenEXR, Cineon or TIFF file. These scanned frames represent the proper grain structure of each of the specific regions of the film characteristic curve and hereinafter referred to as "grain assets". The grain assets may then be applied to digital video as explained below.

Figure 4:
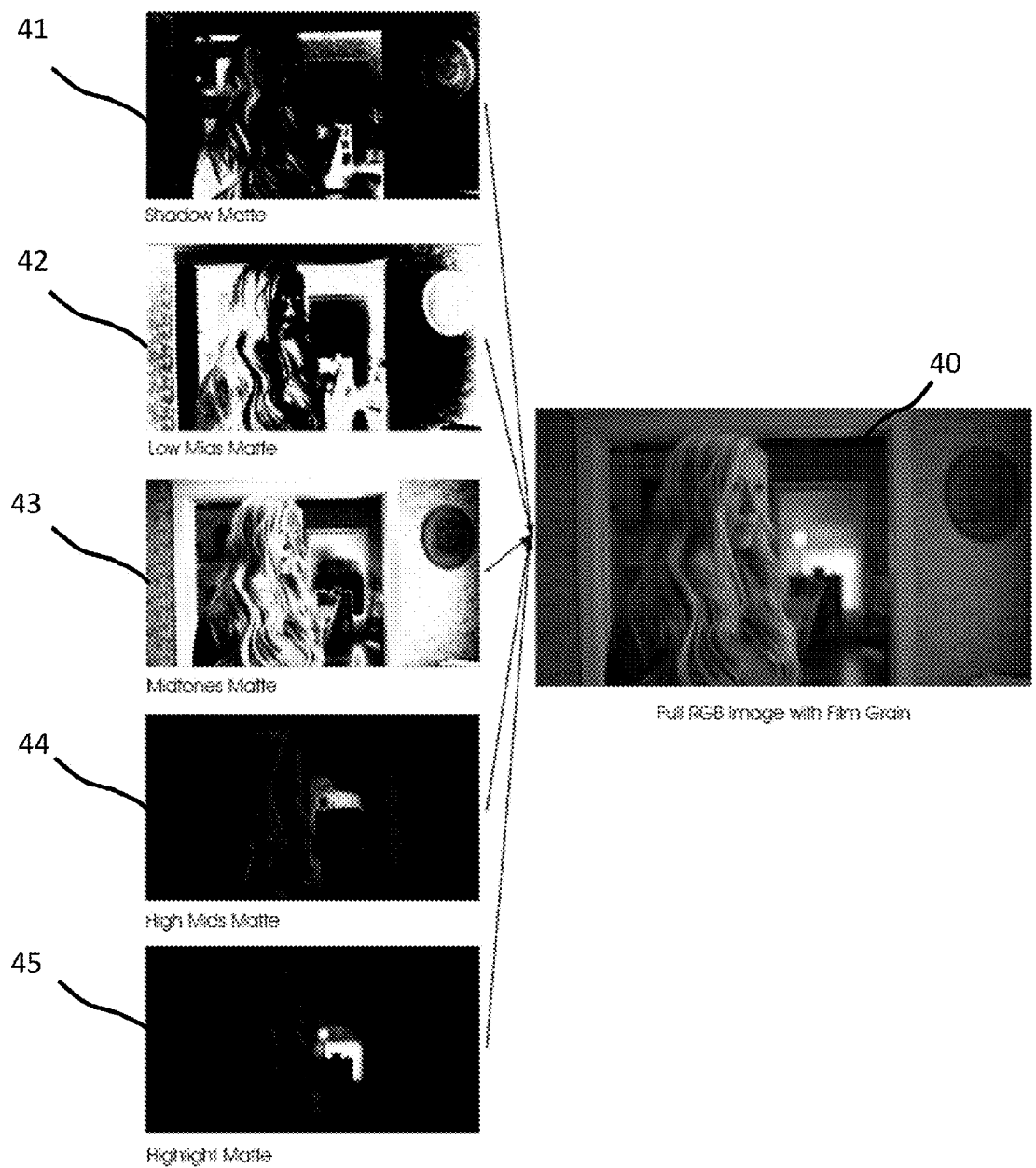
FIG. 4 is a graphic representation of separation of a digital image into different mattes according to an embodiment of the present invention.
Figure 5:
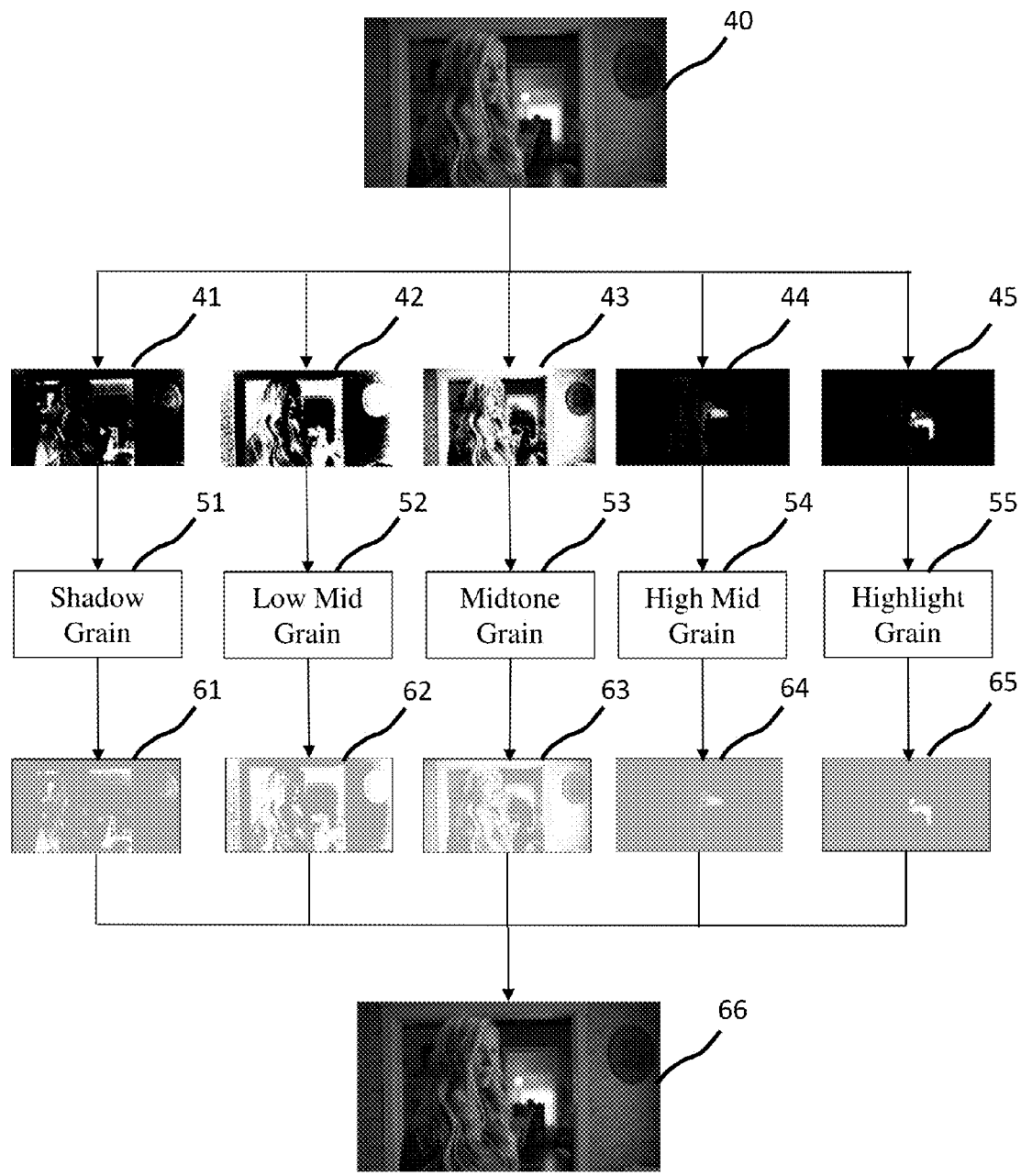
FIG. 5 is a graphic representation of a process for separating a digital image into different mattes, combining each of those mattes with grain assets for those mattes and then combining the mattes into a final image according to an embodiment of the present invention.

To apply the proper grain asset, as seen in FIGS. 4 and 5, each frame 40 of digital video is separated into different luminance delineated matte images. Care is taken when selecting these regions to ensure that they match the correct tonal values along the film's DLogE curve (FIG. 2). Also, attention is spent on where these areas intersect as well as the crossover zones, where one zone crosses over to the next. Improper handling of the crossover areas may cause banding and other tonal artifacts in the image.

Since each Luminance Key receives its own grain treatment it is important to see how one luminance area transitions into the next. If the transition is not smooth, then the viewer may notice grain in that area as being contained to a particular pocket, hence revealing the matte. With film the crossover from region to region is very organic. That organic feel is replicated by ensuring that the feathering from region to region is smooth, that there is not too much overlap and also that there are limited, and preferably no, holes or gaps in the final grain layer mask. To accomplish this, softness controls are implemented that control the feathering of both the outgoing luminance delineated area as well as the incoming luminance delineated area. Through careful inspection of the original film, thresholds for these softness parameteres are preset to replicate the tonal transitions found in the original film stock and to prevent holes, gaps and undesirable crossover effects.

In an embodiment, with reference to FIGS. 2, 4 and 5, a first delineated matte image 41 is selected for luminance values corresponding to the shadows region 21 of the DLogE curve, a second 42 luminance delineated matte image is selected for luminance values corresponding to the low mids region 22 of the DLogE curve, a third luminance delineated matte image 43 is selected for luminance values corresponding to the midtones region 23 of the DLogE curve, a fourth luminance delineated matte image 44 is selected for luminance values corresponding to the high mids region 24 of the DLogE curve and a fifth luminance delineated matte image 45 is selected for luminance values corresponding to the highlights region 25 of the DLogE curve.

Although FIGS. 4 and 5 show an embodiment where the digital video image is separated into five different luminance delineated matte images, the number of different luminance delineated matte images may be varied depending for example on how many separate regions of the film characteristic curve have been mapped into grain assets. The number of separate regions that have been mapped into grain assets may also vary depending on the DLogE curve shape of a given motion picture film. Accordingly, the digital video image may be separated into different numbers of luminance delineated matte images depending on which motion picture film type grain is being applied.

In an alternative embodiment, with reference to FIG. 1, a first luminance delineated matte image is selected for luminance values corresponding to the toe region 12 of the DLogE curve 10, a second luminance delineated matte image is selected for luminance values corresponding to the straight line region 14 of the DLogE curve and a third luminance delineated matte image is selected for luminance values corresponding to the shoulder region 16 of the DLogE curve. In an additional embodiment, the digital video image is separated into 12 different luminance delineated matte images As shown in FIG. 5, once the luminance mattes are created, they are linked to their appropriate grain assets according to their position on the Film's DLogE curve (FIG. 2). The grain assets are then married together through an overlay algorithm that binds the correct grain asset to each corresponding luminance delineated matte image (that portion of the digital video image frame needing that particular grain treatment) to form asset plates. The overlay algorithm may be a blend mode commonly known to those of skill in the art. For example, the blend mode may be a soft-light blend mode such as described by the World Wide Web Consortium (W3C) at http://www.w3.org./TR/compositing, the entire contents of which are hereby incorporated herein by reference. Optionally, the overlay algorithm is adapted and tuned for multilayer parallel processing.

In an embodiment, as shown in FIG. 5, the first luminance delineated matte image 41 corresponding to the shadows region 21 of the DLogE curve is married to a first grain asset 51 corresponding to the shadows region of the DLogE curve, resulting in a first asset plate 61. The second luminance delineated matte image 42 corresponding to the low mids region 22 of the DLogE curve is married to a second grain asset 52 corresponding to the low mids region of the DLogE curve, resulting in a second asset plate 62. The third luminance delineated matte image 43 corresponding to the midtones region 23 of the DLogE curve is married to a third grain asset 53 corresponding to the midtones region of the DLogE curve, resulting in a first asset plate 61.

The fourth luminance delineated matte image 44 corresponding to the high mids region 24 of the DLogE curve is married to a fourth grain asset 54 corresponding to the high mids region of the DLogE curve, resulting in a fourth asset plate 64. The fifth luminance delineated matte image 45 corresponding to the highlights region 25 of the DLogE curve is married to a fifth grain asset 55 corresponding to the highlights region of the DLogE curve, resulting in a fifth asset plate 65.

Once the appropriate grain has been applied to each of the luminance delineated matte images, the individual asset plates are combined together as RGB image 66, complete with grain. In an embodiment, the individual asset plates are overlaid on top of each other and then summed with the source digital video image frame.

FIG. 5 shows the dynamic nature of the matte assembly process. Because the method takes into account the possible luminance values in an image, the method does not need to be frame adjusted or key-framed to maintain its accuracy. As the content of the photographed digital video images evolve in a scene, so will the nature of the grain and texture mapping in the scene. This fluid and automated relationship is referred to as dynamic multi-layered film grain and texture mapping. The digital video images are given the organic and analog nature of motion picture film.

As will be understood by one of ordinary skill in the art, different types of film have different grain patterns and different responses to exposure levels. Accordingly, it may be desirable to simulate the grain of different types of film in different video projects, or even different parts of the same video project. In an embodiment of the present invention, a user is prompted to select a film type to simulate for a given frame or group of frames of video. The system receives a film type selection from a user prior to adding a different grain asset to each of the plurality of luminance delineated matte images. The film type may be selected using, for example, a pull down menu or radio box. In an embodiment, the system has a default film type for simulation.

In an additional embodiment of the present invention, the user may alter the luminance threshold values to dynamically change where grain is applied. For example, with reference to FIGS. 2, 4 and 5, in an embodiment where a frame of digital video is separated into five luminance delineated matte images corresponding to the shadows region 21, low mids region 22, midtones region 23, high mids region 24 and the highlights region 25 of the DLogE curve respectively a user may be prompted to select the luminance threshold values for each of the five delineated matte image. The user may be presented with a set of selection sliders for each region of the DLogE curve.

In an embodiment, a user is provided with a first slider to set the bottom threshold a second slider to set the top threshold for each of the delineated matte images. In this embodiment, theoretically a user may manipulate the upper and lower threshold of each delineated matte image such that the entire frame may be provided with grain corresponding to a single region (e.g. midtones region 23) of the DLogE curve. In an embodiment, the upper and lower thresholds of each delineated matte image have a default value. In an additional embodiment, the upper and lower thresholds of each delineated matte image have a default value that varies depending on the type of film selected.

In an additional embodiment, a user is further prompted to select how grain is to be applied to that matte image. For example, the user may be prompted to select varying levels of opacity, gain, sizing or softness of the applied grain for each delineated matte image. In an embodiment, the user is presented with at least one slider to adjust the level of softness. In an embodiment, the user is presented with at least one slider to adjust the level of opacity and gain. In an embodiment, the user is presented with at least one slider to adjust the level of sizing. In an embodiment, the softness, sizing, gain and opacity of grain applied to each delineated matte image have default values. In an additional embodiment, the softness, sizing, gain and the opacity of grain applied to each delineated matte image varies depending on the type of film selected.

In an additional embodiment of the present invention, to allow the user to better visualize the different luminance delineated matte images within a frame of video, the user is shown an augmented video frame wherein each different delineated matte image is shown in a distinct color. For example, the first luminance delineated matte image 41 corresponding to the shadows region 21 of the DLogE curve may be shown is red, the second luminance delineated matte image 42 corresponding to the low mids region 22 of the DLogE curve may be shown in yellow, the third luminance delineated matte image 43 corresponding to the midtones region 23 of the DLogE curve may be shown in green, the fourth luminance delineated matte image 44 corresponding to the high mids region 24 of the DLogE curve may be shown in cyan, and the fifth luminance delineated matte image 45 corresponding to the highlights region 25 of the DLogE curve may be shown in blue. In a further embodiment, the augmented video frame is updated to reflect user changes to the luminance threshold values.

In a further embodiment, the augmented video frame reflects user changes to the levels of opacity, gain, sizing or softness of the applied grain for each delineated matte image. For example, the opacity, gain, sizing or softness of the color of a luminance delineated matte image area may be altered in response to user changes to the levels of opacity, gain, sizing or softness of the applied grain for that luminance delineated matte image area.

The present invention emulates film grain by fully mapping the textural context of motion picture film. The present invention, according to an embodiment, accomplishes this task with the added bonus of providing a live, real time dynamic mapping that changes frame by frame as the digital video images underneath it change.

The method described in this invention can make digital video projects look so much like film origination that experienced filmmakers with decades of motion picture film experience cannot differentiate original film camera negative from digital video with the method of the present invention applied to it. A comparison test was done and experienced motion picture film experts could not differentiate the camera film negative from the treated digital video image. By carefully representing the entire tonal curve of a motion picture film stock, this invention gives the viewer the full and accurate representation of the full textural dynamics of motion picture film.

In an embodiment, the present invention may be implemented using DaVinci Resolve® as a free standing node tree (each frame of a digital video is fed to individual nodes which are fed into a Luma Keyer that separates the digital image into luminance mattes to which the appropriate grain is then applied). In another embodiment, the method of the present invention may be packaged and used as a free standing OpenFX Plug-in (for use with other video editing software such as Nuke and Baselight). Additionally, the method of the present invention may also be implemented in other video editing software that allows for external assets to be associated as mattes to existing digital video image frames.

There is disclosed in the above description and the drawings, an imaging system that fully and effectively overcomes the disadvantages associated with the prior art. However, it will be apparent that variations and modifications of the disclosed embodiments may be made without departing from the principles of the invention. The presentation of the preferred embodiments herein is offered by way of example only and not limitation, with a true scope and spirit of the invention being indicated by the following claims.

Any element in a claim that does not explicitly state "means" for performing a specified function or "step" for performing a specified function, should not be interpreted as a "means" or "step" clause as specified in 35 U.S.C. §112.

What is claimed is:

1. A method for processing digital video to have grain corresponding to a motion picture film, the method comprising:
   receiving a plurality of different grain assets corresponding to different film exposure levels;
   receiving a digital video image;
   separating the digital video image into a plurality of luminance delineated matte images;
   adding a different grain asset to each of the plurality of luminance delineated matte images to create a plurality of asset plates; and
   combining the plurality of asset plates to form a final digital video image.

2. The method of claim 1 wherein there are three different grain assets corresponding to different film exposure levels and the digital video image is divided into three luminance delineated matte images.

3. The method of claim 2 wherein a first grain asset corresponds to a toe of a DLogE curve for the motion picture film; a second grain asset corresponds to a straight line of the DLogE curve for the motion picture film; and a third grain asset corresponds to a shoulder of the DLogE curve for the motion picture film; and
   wherein a first luminance delineated matte image has luminance values corresponding to the toe of the DLogE curve for the motion picture film; a second luminance delineated matte image has luminance values corresponding to the straight line of the DLogE curve for the motion picture film; and a third luminance delineated matte image has luminance values corresponding to the shoulder of the DLogE curve for the motion picture film.

4. The method of claim 1 wherein there are five different grain assets corresponding to different film exposure levels and the digital video image is divided into five luminance delineated matte images.

5. The method of claim 4 wherein a first grain asset corresponds to a shadow portion of a DLogE curve for the motion picture film; a second grain asset corresponds to a low mid portion of the DLogE curve for the motion picture film; a third grain asset corresponds to a midtones portion of the DLogE curve for the motion picture film; a fourth grain asset corresponds to a high mid portion of the DLogE curve for the motion picture film; and a fifth grain asset corresponds to a highlights portion of the DLogE curve for the motion picture film; and
   wherein a first luminance delineated matte image has luminance values corresponding to the shadow portion of the DLogE curve for the motion picture film; a second luminance delineated matte image has luminance values corresponding to the low mid portion of the DLogE curve for the motion picture film; a third luminance delineated matte image has luminance values corresponding to the midtones portion of the DLogE curve for the motion picture film; a fourth luminance delineated matte image has luminance values corresponding to the high mids portion of the DLogE curve for the motion picture film; and a fifth luminance delineated matte image has luminance values corresponding to the highlights portion of the DLogE curve for the motion picture film.

6. The method of claim 1 further comprising: receiving a film type.

7. The method of claim 1 further comprising: receiving at least one threshold modification for separating the digital video image into a plurality of luminance delineated matte images.

8. The method of claim 7 further comprising: receiving at least one grain application modification for changing at least one of the group consisting of: opacity, gain, sizing or softness of grain asset application to at least one of the plurality of luminance delineated matte images.

9. The method of claim 7 further comprising: displaying an augmented digital video image wherein each of the plurality of luminance delineated matte images are displayed in a different color.

10. The method of claim 9 further comprising: redisplaying the augmented digital video image to reflect the received at least one threshold modification for separating the digital video image into a plurality of luminance delineated matte images.

11. The method of claim 9 further comprising: redisplaying the augmented digital video image to reflect the received at least one grain application modification.

12. A non-transitory computer readable medium containing program instructions for causing a computer to perform a method for processing digital video to have grain corresponding to a motion picture film comprising the steps of:
   receiving a plurality of different grain assets corresponding to different film exposure levels;
   receiving a digital video image;
   separating the digital video image into a plurality of luminance delineated matte images;
   adding a different grain asset to each of the plurality of luminance delineated matte images to create a plurality of asset plates; and
   combining the plurality of asset plates to form a final digital video image.

13. The non-transitory computer readable medium of claim 12 wherein there are three different grain assets corresponding to different film exposure levels and the digital video image is divided into three luminance delineated matte images.

14. The non-transitory computer readable medium of claim 12 wherein there are five different grain assets corresponding to different film exposure levels and the digital video image is divided into five luminance delineated matte images.

15. The non-transitory computer readable medium of claim 12 further comprising program instructions for causing a computer to receive a film type.

16. The non-transitory computer readable medium of claim 12 further comprising program instructions for causing a computer to receive at least one threshold modification for separating the digital video image into a plurality of luminance delineated matte images.

17. The non-transitory computer readable medium of claim 16 further comprising program instructions for causing a computer to receive at least one grain application modification for changing at least one of the group consisting of: opacity, gain, sizing or softness of grain asset application to at least one of the plurality of luminance delineated matte images.

18. The non-transitory computer readable medium of claim 16 further comprising program instructions for causing a computer to display an augmented digital video image wherein each of the plurality of luminance delineated matte images are displayed in a different color.

19. The non-transitory computer readable medium of claim 16 further comprising program instructions for causing a computer to redisplay the augmented digital video image to reflect the received at least one threshold modification for separating the digital video image into a plurality of luminance delineated matte images.

20. A system for processing digital video to have grain corresponding to a motion picture film, the method comprising:
 a means for receiving a plurality of different grain assets corresponding to different film exposure levels;
 a means for receiving a digital video image;
 a means for separating the digital video image into a plurality of luminance delineated matte images;
 a means for adding a different grain asset to each of the plurality of luminance delineated matte images to create a plurality of asset plates; and
 a means for combining the plurality of asset plates to form a final digital video image.

* * * * *